United States Patent
Steinacher

[11] 3,985,424
[45] Oct. 12, 1976

[54] PANORAMIC REAR VIEWING SYSTEM

[75] Inventor: Ken Steinacher, Mahopac, N.Y.

[73] Assignee: Lawrence Peska Associates, Inc., New York, N.Y. ; a part interest

[22] Filed: June 18, 1975

[21] Appl. No.: 588,036

[52] U.S. Cl. ............................. 350/96 BC; 350/167
[51] Int. Cl.² ............................................. G02B 5/16
[58] Field of Search ............ 350/96 BC, 96 C, 96 B, 350/304, 167, 31

[56] References Cited
UNITED STATES PATENTS

| | | | |
|---|---|---|---|
| 1,676,901 | 7/1928 | Hueller | 350/31 |
| 3,501,218 | 3/1970 | Zitzelberger | 350/96 BC |

FOREIGN PATENTS OR APPLICATIONS

| | | | |
|---|---|---|---|
| 1,103,213 | 2/1968 | United Kingdom | 350/96 BC |

*Primary Examiner*—John K. Corbin
*Assistant Examiner*—Stewart Levy
*Attorney, Agent, or Firm*—Jack D. Slobod

[57] ABSTRACT

A panoramic rear viewing system for an automotive vehicle includes plural fiber optic bundles having input ends mounted behind lenses in swivel mounts at various positions around the periphery of the roof of the vehicle for viewing in adjoining rearward azimuthal sectors. The output ends of the fiber optic bundles are located in a side by side array behind a similar array of magnifying lenses within view of the driver for combining the sector images carried by the bundles into a panoramic view.

1 Claim, 4 Drawing Figures

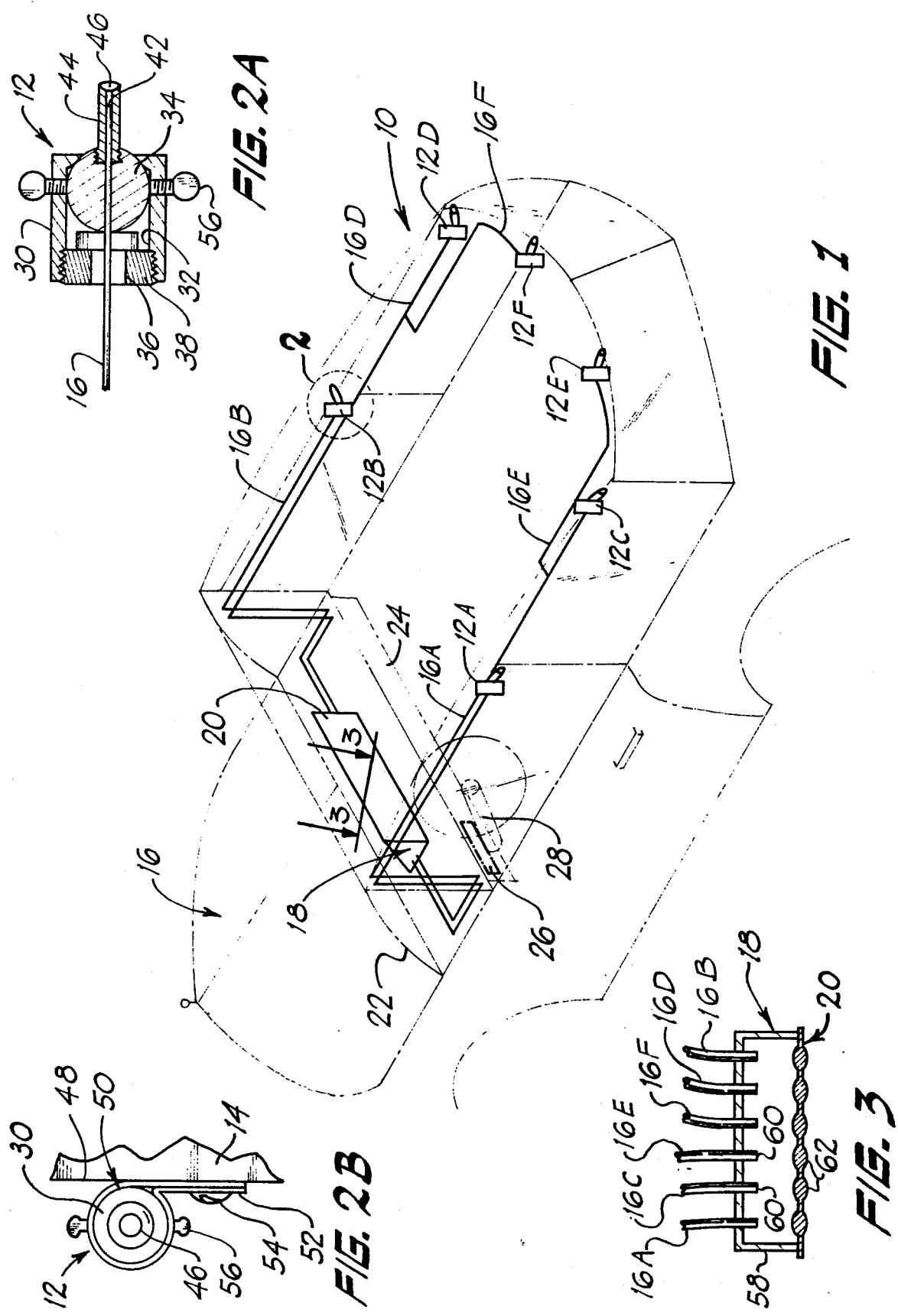

PANORAMIC REAR VIEWING SYSTEM

FIELD OF THE INVENTION

The present invention relates generally to rearview systems for automotive vehicles of a type which provide a simultaneous view from plural viewing directions. In its particular aspects the present invention relates to the provision of fiber optic bundles for carrying images from different rearward azimuthal sectors to a combined viewing area.

BACKGROUND OF THE INVENTION

It is well known that the usual rearview mirror provided on an automotive vehicle for viewing through the rear window of the vehicle produces inherent blind spots. Furthermore, due to the folding of the optical viewing path by the mirror, objects may not be seen when the driver's head shifts in position. This sensitivity to head movement is characteristic of mirror systems.

To provide additional rearward viewing ability various reflective viewing systems have been proposed for providing a split image to a driver from plural fields of view. These systems, which involve plural mirrors are bulky and consequently difficult to integrate into a vehicle. Furthermore, such reflective systems are inherently sensitive to head movement.

OBJECTS OF THE INVENTION

It is an object of the present invention to provide a panoramic rear viewing system for an automotive vehicle which does not involve bulky parts, so that it may be easily integrated into the design of new vehicles as well as installed on existing vehicles.

It is a further object of the present invention to provide a panoramic rear viewing system for an automotive vehicle having directions of view which are insensitive to movement of the driver's head.

SUMMARY OF THE INVENTION

Briefly, the aforementioned and other objects of the present invention are satisfied by utilizing plural fiber optic bundles having input ends positioned on an automotive vehicle for viewing in different rearward azimuthal sectors. The output ends of the fiber optic bundles are provided in side by side relationship behind an array of magnifying lenses within view of the driver for combining the images carried by the fiber optic bundles into a panoramic view.

The fiber optic bundles being small may easily be trained along the roof of an existing vehicle and may be integrated into the design of new vehicles. The viewing directions of the fiber optic bundles are determined solely by the angular orientation of the input ends of the bundles. Thus, view direction sensitivity to head movement is completely eliminated, since in effect the eye perceives a real image at the output end of the fiber optic bundles.

Other objects, features, and advantages of the present invention will become apparent upon perusal of the following detailed description of the preferred embodiment thereof when taken in conjunction with the appended drawing wherein:

FIG. 1 is a pictorial presentation of the panoramic rear viewing system of the present invention;

FIG. 2A is a cross-sectional side view of a portion of FIG. 1 within the balloon labelled 2;

FIG. 2B is an end view of FIG. 2A; and

FIG. 3 is a cross-sectional top view of a portion of FIG. 1 taken along the lines 3—3 therein.

DETAILED DESCRIPTION

The panoramic rearview system 10 of the present invention comprises plural light receiving units 12 mounted in spaced apart location around the rear portion of the periphery of a roof 14 of an automotive vehicle 16. Preferably there are six light receiving units 12 which may be oriented azimuthally to view adjoining azimuthal sectors or fields of view. Thus a preferable azimuthal field of view for each of units 12 is approximately thirty degrees to provide a combined one hundred and eighty degree azimuthal panorama around the rear of the vehicle. Preferably two of units 12, labelled 12A and 12B are mounted midway along the roof length and on opposite sides thereof to provide primarily lateral view of the usual blind spots. Furthermore, two of the units 12, labelled 12C and 12D are mounted on opposite rear corners of the roof 14 to view diagonally, and the remaining two units, labelled 12E and 12F are mounted transversely spaced apart over the rear line of the roof 14 to view generally rearwardly.

Plural fiber optic bundles labelled 16A through 16F are respectively connected to light receiving units 12A through 12F and are trained forwardly along the periphery of roof 14 and downward through the roof to a viewing box 18 within vehicle 16 having a horizontally elongated rectangular front face 20 positioned in front of windshield 22 in the location where a rear view mirror is normally provided. As will be understood as the discussion proceeds, viewing box 18 combines the images provided by units 12 into a panoramic view. Alternatively, viewing box 18 may be integrated into dashboard 24 such as at 26 directly above steering column 28 so as not to obstruct windshield 22.

Before explaining the details of viewing box 18, the light receiving unit 12 as illustrated in FIGS. 2A and 2B will be further discussed. Each unit 12 comprises a cylindrical housing 30 having a central bore 32 in which is captured a ball 34. The fiber optic bundle 16 passes through a central hole 36 in jam nut 38, forming an end wall of housing 30, and thence through a central hole 40 in ball 34. The flat input end 42 of fiber optic bundle 16 terminates within a tubular sleeve 44 threaded into ball 34 and carrying at its end a convex lens 46. The lens 46 and the input end of bundle 42 are positioned so that the lens focusses a thirty degree field of view image onto end 42.

The housing 30 is fixedly mounted on the sidewall 48 of roof 14 via a sheet metal bracket 50 surrounding the circumference of housing 30 and having a tab 52 connected to sidewall 48 by a screw 54.

The ball 34 in bore 32 comprises a swivel joint for adjusting the viewing direction of the fiber optic bundle input end 42 and lens 46 so that the fields of view of the various light input units 12 comprise adjoining azimuthal sectors. After the viewing direction is adjusted, ball 34 is locked in place by tightening a pair of thumb set screws 56 threaded radially through housing 30 and bearing on the ball.

As illustrated in FIG. 3, the viewing box 18 comprises an elongated casing 58 along the back of which are provided apertures to receive the light output ends 60 of fiber optic bundles 16A through 16F in side by side spaced apart relationship directed toward front face 20. The front face 20 is configured as a molded plastic rectangular slab having six spherical protrusions 62 on both sides thereof in side by side relationship. The protrusions 62 comprise an array of magnifying lenses, in register with output ends 62. The interposition of the magnifying protrusions between the output ends 60 of the fiber optic bundles and the driver optically magnify the ends 60.

To provide a panoramic view, the fiber optic bundles 16 are arrayed horizontally in the order shown in FIG. 3 to adjoin images from adjoining fields of view.

As should be appreciated by those skilled in the art, an image of each field of view is formed on fiber optic input end 42 by lenses 46, these images are transferred to output ends 60 where they are viewed in magnified form via lens protrusions 62.

It will further be appreciated that the viewing directions of system 10 is determined solely by the orientation of fiber optic bundle input ends 42. Since the driver views what is in effect an image located at the output ends 60 of the fiber optic bundles, shifting of the driver's head does not effect the direction of rear view as is the case in mirror systems.

Having described in detail the preferred embodiment of the present invention it should be apparent that numerous modifications, additions and omissions in the details thereof are possible within the intended scope of the invention. For example, the fiber optic bundles 16 and light input units 12 being relatively compact could be integrated into the walls of the vehicle and be located at other positions than shown. Accordingly, the following claims define the scope of the invention.

What is claimed is:

1. In an automatic vehicle, a panoramic rear viewing system comprising: plural fiber optic bundles having light input ends and light output ends; lockable swivel means mounting said light input ends on said vehicle at spaced apart locations for view in different generally rearwardly facing generally adjoining azimuthal sectors; said light output ends lying horizontally spaced apart in a horizontally elongated viewing area within said vehicle; and a transparent plate of varying thickness in front of said viewing area, the thickness of said plate being varied to form plural horizontally spaced apart magnifying lens means in register with said respective light output ends.

* * * * *